INVENTORS.
Robert W. Wirtz
Harold B. Ratcliff
John S. Turner, Jr.
By: Kegan and Kegan
Attys.

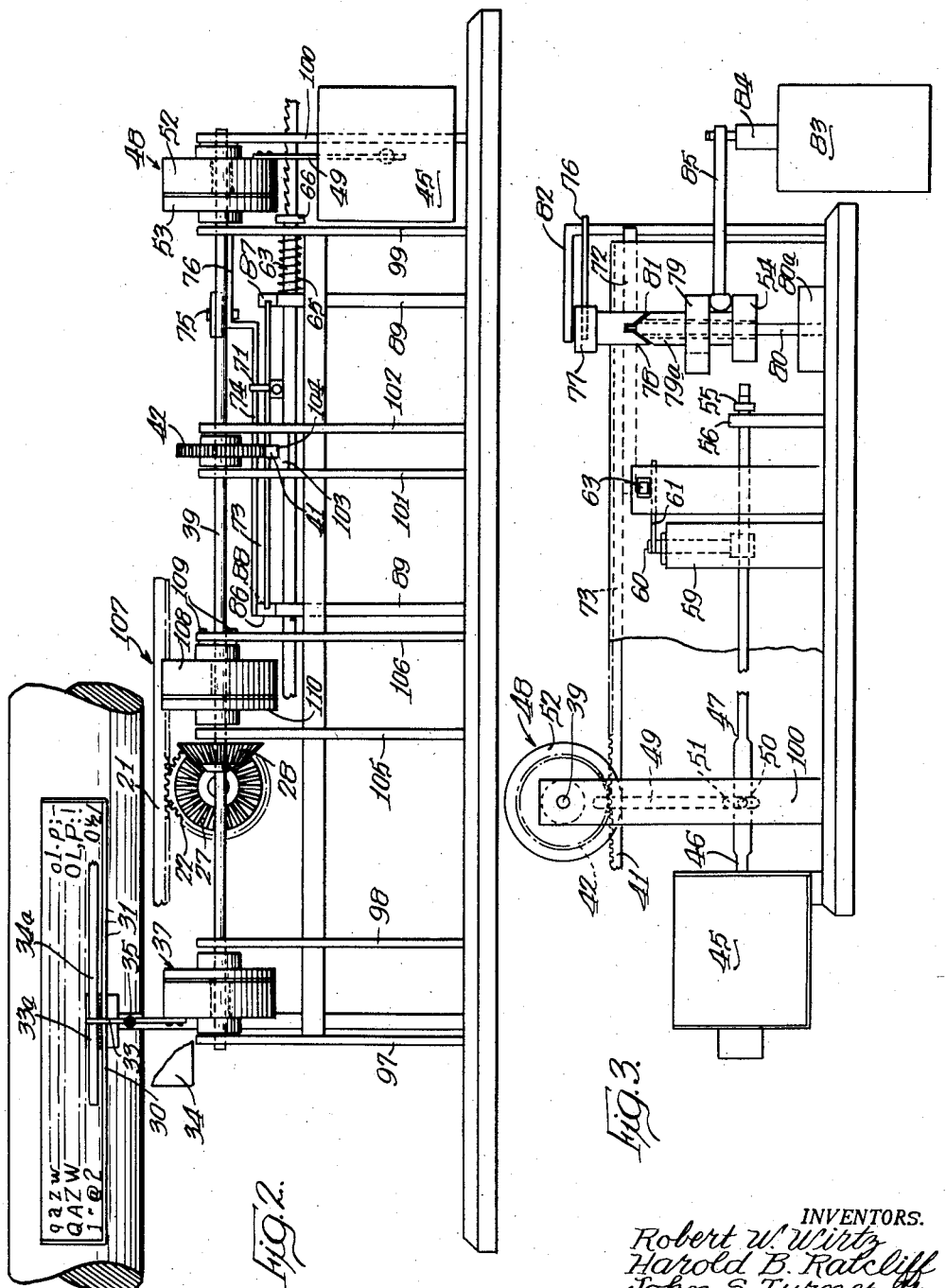

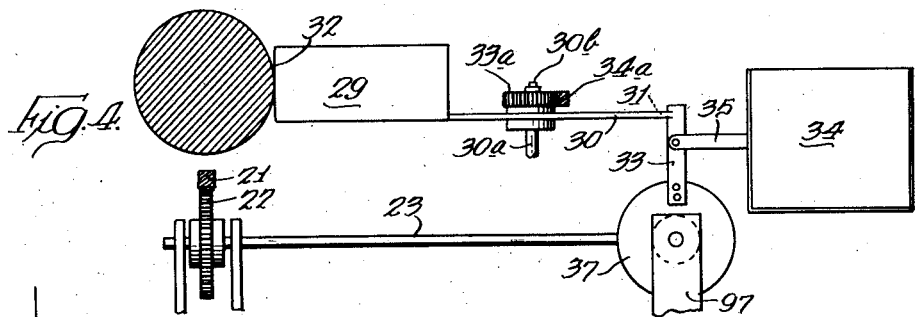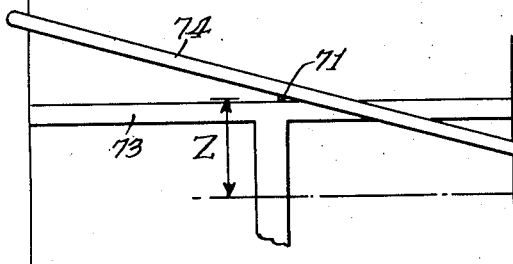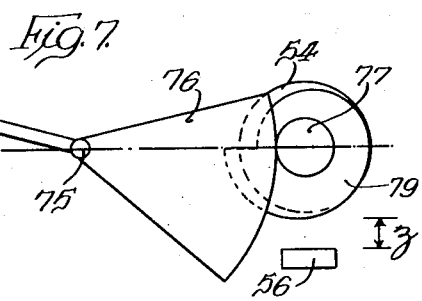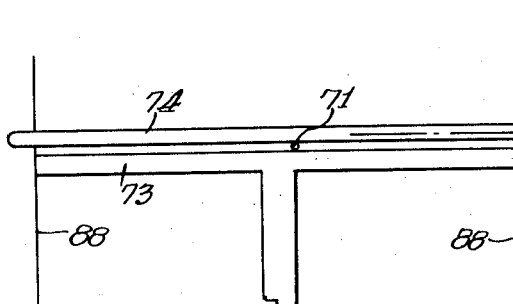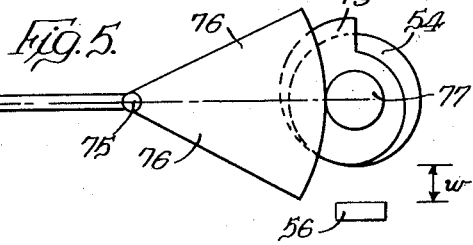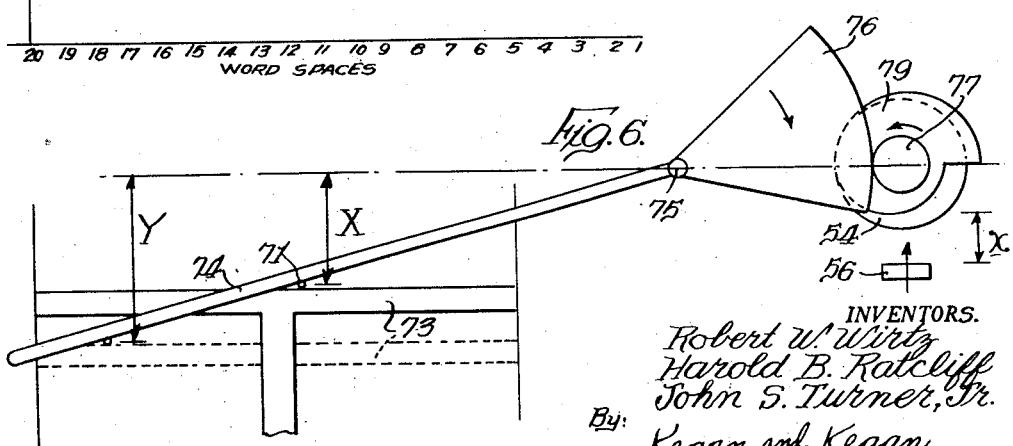

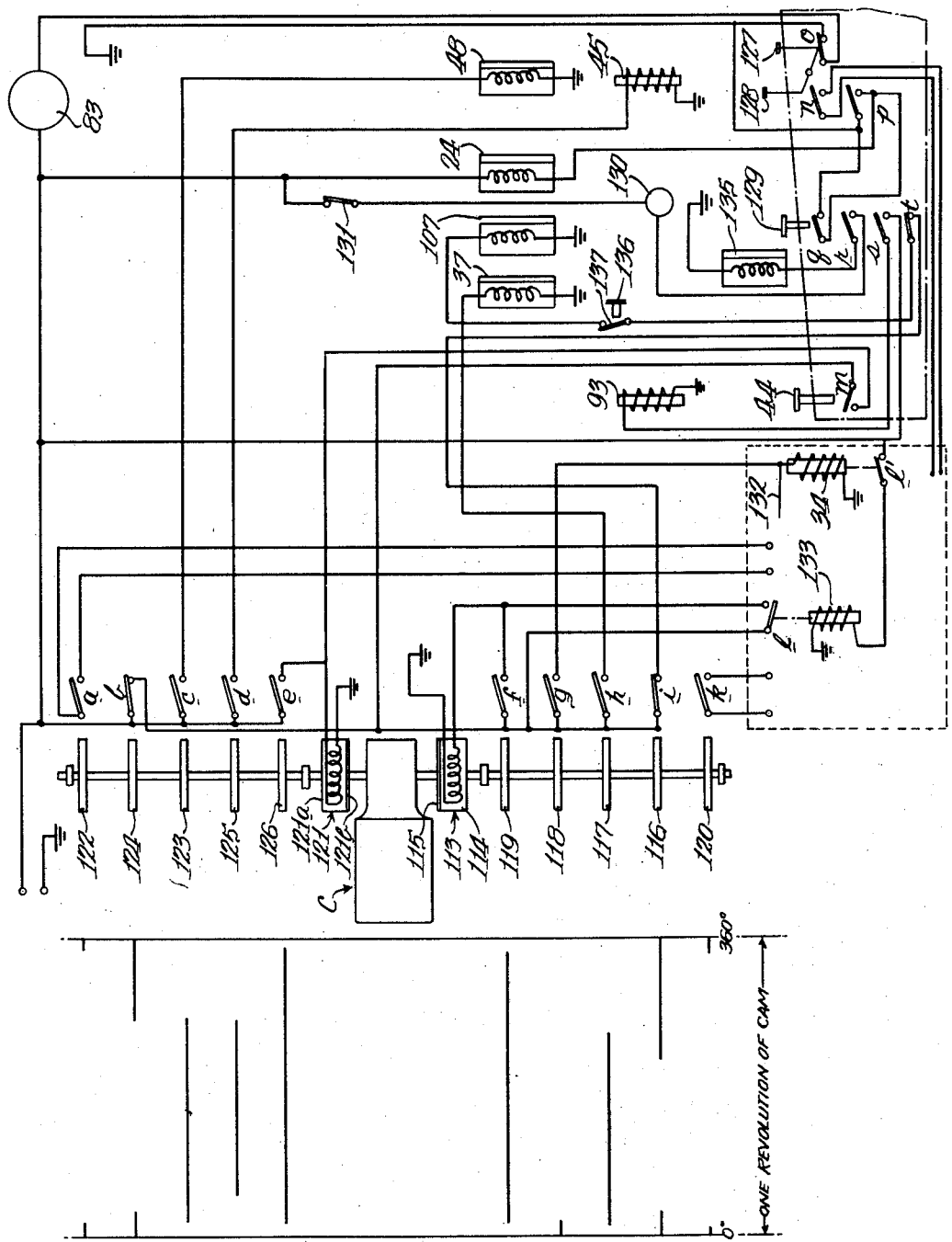

United States Patent Office 2,898,827
Patented Aug. 11, 1959

2,898,827

PROPORTIONAL SPACING AND JUSTIFYING MECHANISM

Robert W. Wirtz, Plainfield, N.J., and Harold B. Ratcliff and John S. Turner, Jr., Peoria, Ill., assignors to Wirtz Company, Chicago, Ill., a copartnership Application April 18, 1955, Serial No. 502,028

22 Claims. (Cl. 95—4.5)

This invention relates to the art of printing and to improved measuring and control means for producing lines of proportionally spaced and justified matter.

This invention is adaptable for attachment to a standard typewriter for controlling paper carriage movement. The instant invention, however, has particular application to photoprinting apparatus wherein an immediate photographic copy of proportionally spaced and justified text material is prepared for direct use in any suitable reproduction process, such as photo-lithography.

The invention when used with photoprinting apparatus contemplates the provision of means for controlling the movement of film across a photographic exposure area in direct relationship to the width of the characters selected for exposure, and further provides means for justifying the lines of characters. The characters may be selected and positioned for exposure by any suitable mechanism designed for such purpose, such as by the keyboard of a typewriter. One such machines is disclosed in our copending application for patent for Photocomposing Apparatus, Serial No. 485,936, filed February 3, 1955. Also, the typewriter used to actuate the photoprinting apparatus may, itself, be designed to produce proportionally spaced and justified printed matter. Of notable importance, however, is the fact that the present photoprinter film carriage advancement is independent of the typewriter paper carriage, and that it may even be used to control the paper carriage.

There are certain disadvantages which are inherent in known differentially spacing and justifying mechanisms. Their manner of measuring character widths and required adjustments for justification are crude and inaccurate, since they do not provide for an unlimited number of widths for each character and infinite variations of word spaces for justification. Measuring dials and indicating scales, used in many machines, are difficult to read while often also requiring further computation by the operator in order to achieve justified lines. Accurate control of the platen or carriage is difficult because of lost motion in spacing and justification control mechanisms connected directly thereto, while the mass of the control mechanisms also acts to retard platen or carriage movement and hence slows down operation. Moreover, known differentially spacing and justifying mechanisms are costly, and difficult to maintain and operate.

Therefore, it is an object of this invention to overcome these and other unfavorable conditions resulting from the use of the previous known machines for producing proportionally spaced text and/or lines of justified printed matter.

A principal object of this invention is to provide justifying mechanism which permits infinite variations in advancement of the carriage wherein the printed matter is reproduced in order to achieve justified lines.

Another object of this invention is to provide justification mechanism which does not affect character spacing, although the character spacing itself may vary according to the space requirements of each character, but which automatically produces justified lines by controlling carriage advancement between words.

It is another object of this invention to provide mechanism for mechanically measuring the length of an unjustified line as it is produced and the number of word spaces in the line. The mechanism then modifies the length of the standard word space, taking into account the distance by which the line fails to be justified and the number of word spaces in the line, permitting automatic justification of the line upon a second typing thereof.

A further object of this invention is to provide justification mechanism controlled by the word space bar of a standard typewriter, whereby variations of carriage feed between words are automatically achieved to make each line conform to any desired standard justified line length.

An essential feature of this invention is the employment of a single carriage drive means which is selectively driven by either of two probes which, in turn, respectively measure the requirements for character and word spaces.

Still another object of this invention is to provide a simple and efficient interchangeable member for controlling carriage advance in proportion to the widths of the characters selected for reproduction.

A still further object of this invention is to provide carriage advancement control mechanism which operates independently of carriage movement, which does not add to carriage mass, and which thus does not retard carriage travel, thereby permitting a more rapid reproduction of selected characters.

Another essential feature of this invention is to provide photoprinting apparatus capable of furnishing finished lines of proportionally spaced and justified printed text material for use in a reproduction process, such as photo-lithography.

Another feature of this invention is to provide electrical circuits and controls which assure proper sequential operation of the carriage and its measuring and advancing mechanisms.

And, another object of this invention is to provide carriage advancement control mechanism which is simple and economical to produce, which is fast and efficient, and which is easy to use and automatic when operated so that it may be employed without requiring special training or skill.

The objects mentioned and implied from the foregoing discussion are achieved by the new spacing and justification mechanism, mainly by the following features of the same: transverse movement of the carriage for both word and character spacing is acheived through a single drive shaft. Disposed adjacent this shaft and operatively connected therewith are a pair of motor actuated probes which cause measured rotation of the shaft, and hence accurate travel by the carriage for each word and character space. One of the probes is actuated each time a character is selected for reproduction, while the other probe operates for word spacing. The character spacing probe is cooperable with a movable member having a set of stops thereon corresponding to related characters. The distance of each stop from a standard probe position is varied according to the space requirements of the related characters. Advantageously this movable member and its stops are interchangeable so that each style and size of type may have its own individual control means. Furthermore, when the invention is used in apparatus for photographically producing text material, the movable member is situated adjacent to the film carriage and adapted to carry an exposure segment having a set of characters thereon for display to the film in the film carriage.

The word space probe is cooperable with either of two stop cams which act to limit its travel, and hence carriage travel, each time a word space is required. The stop cams are adjustable in order to provide for different degrees of word space probe travel. One of the stop cams is circular and is used for standard word spacing during the first typing of a line, while the other has a peripherally graduated surface which provides an auxiliary setting allowing justification of a line upon a second typing thereof. The stop cams are simply, economically and efficiently provided, being mounted on a common cam shaft which is shiftable to project either stop cam into the path traveled by the word space probe. During the first typing of a line, the standard word spacing cam is positioned to intercept the word space probe, while the cam shaft rotates each time a word space or a character space is required. The justifying stop cam, in the meantime also rotates so that upon a second typing of the line, the correct portion of its peripherally graduated surface will be in position to intercept the word space probe and limit its travel according to justification requirements. Two factors determine which portion of the justifying stop cam surface is engageable by the word space probe. They are (1) the length of the line and (2) the number of word spaces therein.

In order to determine the length of a line, a line counter mechanism is operatively connected to the drive shaft. Each time a word or character space is inserted into a line, the line counter mechanism moves a proportional amount. A word space counter mechanism also is provided to record the number of word spaces in a line, being cooperable with and actuable by the word space probe each time the word space probe is actuated. The combined movements of the line counter and the word space counter result in the movement of a third mechanism which acts to rotate the cam shaft, and thereby set the correct portion of the peripherally graduated surface on the justifying cam in position for limiting travel by the word space probe. Thus, when the justifying cam is shifted into position to intercept the word space probe upon a second typing of a line, it permits only that probe travel which is required to justify the line.

A system of brake and clutches is provided to couple the particular probe to the carriage moved thereby, so that only the driving stroke of an actuated probe affects movement of the carriage and line counter mechanism. To control the sequence of operation, a unique gang of cam operated contacts is provided, whereby only the particular working mechanism for either character or word spacing is operated, while the remainder of the control apparatus remains in readiness for the next character or word spacing.

In order that the invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that the invention, its objects, and features of construction are not restricted to the particular details recited in the specification or shown in the drawings.

In the drawings:

Figure 2 is a front elevational view of the apparatus shown in Figure 1;

Figure 3 is a right side elevational view of the apparatus shown in Figure 1, and taken on lines 3—3;

Figure 4 is a left side elevational view of the apparatus shown in Figure 1, and taken on lines 4—4;

Figure 5 is a simplified drawing of the justifying control cams and the positioning mechanism therefor, and shows the position of the cams when the length of a line, upon a first typing, equals the desired or justified line length;

Figure 6 is a view similar to Figure 5, but showing cam positioning when the line length falls short of the desired line length;

Figure 7 is a view similar to Figures 5 and 6, but showing cam positioning when the line length is greater than the desired line length; and Figure 8 is a circuit diagram showing in a schematic way a preferred form of control circuits with certain mechanisms, constructed and arranged in accordance with the invention.

Figure 1:
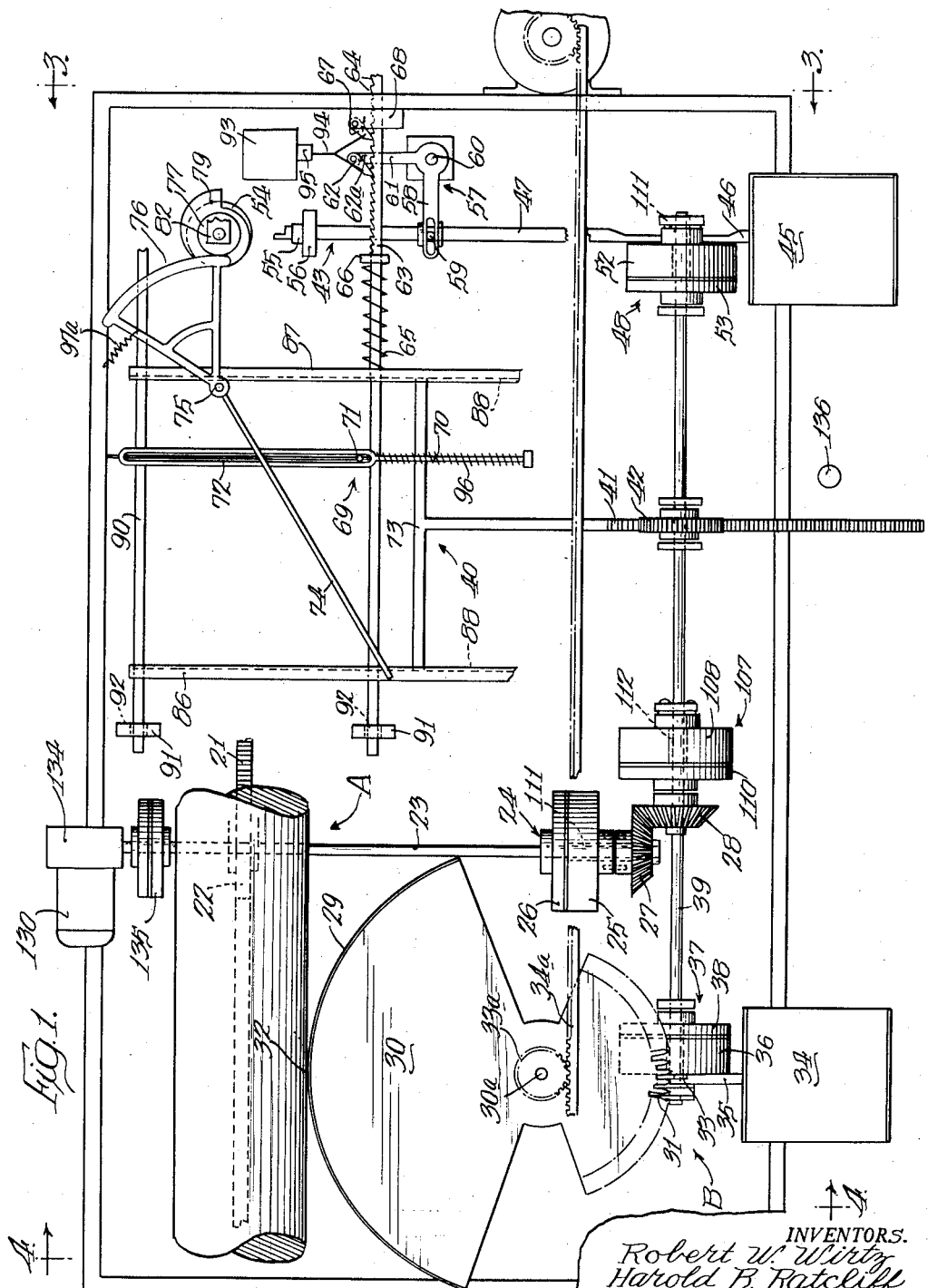
Figure 1 is a plan view of the invention, showing only those parts which are used to control carriage movement.

The apparatus disclosed herein is used on a first and second typing principle. The operator first types a proportionally spaced but unjustified line, thereby setting the justification mechansm, and then proceeds to retype the same line in justified form. To start, the operator first determines the length of the line that is to be composed. A signal, such as the ringing of a bell caused by carriage movement, indicates when the desired line length is neared. After the sounding of the signal, typing may be continued for a short time more (or may be stopped immediately), giving the operator opportunity to finish any word that has been started. During this first typing of the line, use of the word space bar causes a standard carriage advancement for each space between words, while character key actuation causes carriage advancement proportional to the space requirements of each character associated with the selected keys. At the end of the first typing of the line, the justification mechanism is automatically set so that upon a second typing of the line, the distance between words is automatically varied to produce the line in justified form. The justification mechanism is capable of either expanding or shrinking the spacing between words in order to produce justified copy.

The proportional spacing and justification mechanism as illustrated in the accompanying drawings is used to control the film carriage in a typewriter actuated photoprinter. It will be readily understood by those skilled in the art, however, that the mechanism may be applied equally as well to control the movement of a typewriter paper carriage, or that it may be used in the reproduction of justified copy wherein character spacing is of equal unit width.

Referring to the drawings, the film carriage feed mechanism, indicated generally at A, comprises a rack 21 on the carriage underside and engageable with a pinion 22, which is driven through a carriage drive shaft 23 and a carriage drive clutch 24. While only the film platen roller is shown, it is to be understood that the usual film feed mechanism and film supply and take-up magazines are employed to display the film at the exposure area. During the first typing of a line, clutch 24 is deactivated so as to leave the carriage mechanism in its original or starting position. Upon the second typing, the clutch body 25 electromagnetically attracts the clutch plate 26, driving the film carriage as the text is photographically reproduced. A pair of bevel gears 27 and 28 connect the carriage to the proportional spacing mechanism, indicated generally at B.

The proportional spacing mechanism comprises a disc portion 30 which is rotatably mounted on a shaft 30a in the photoprinting machine. A character bearing exposure segment 29 is mounted to disc 30. Notches 31, corresponding to the characters on segment 29, are formed on the rear portion of disc 30. The depth of the notches is critically associated with the width of the corresponding characters. As a result, notches representing such letters as m, w, and W, will have a greater depth than the notches representing such letters as i, l, e, and I. As a character is selected for exposure at the exposure area 32, disc 30 is rotated and selectively positioned. One method of rotating disc 30 is through a pinion 33a keyed to shaft 30a and engageable with a rack 34a connected to the parent machine and actuated thereby. For greater detail on this one means to position the characters at exposure area 32, see our aforementioned pending patent application. A nut 30b (Fig. 4), threaded to the end of shaft 30a, holds pinion 33a and disc portion 30 on shaft 30a. Disc portion 30 thus is easily interchangeable with other discs in order to provide different sets of control notches corresponding to the different styles and sizes of type which may be used.

In order to measure the width of the particular characters and to lock disc 30, a motor solenoid actuated probe arm 33 is adaptable to enter the notch 31 associated with the character selected for display at exposure point 32. To move arm 33 into engagement with the selected notch, a letter space solenoid 34 carries arm 33 on its plunger 35. Arm 33, in turn, is connected to the clutch body 36 of a letter space clutch 37, which when energized permits arm 33 to drive the film carriage through carriage drive shaft 39, and the aforementioned bevel gears 27 and 28 and carriage drive clutch 24.

The depth of travel of arm 33 in the notch associated with the selected character measures the amount of carriage movement for each character that is exposed. With the completion of the forward stroke of letter space plunger 35, a shutter is operated to expose the character to sensitized film on the carriage mechanism. This forward stroke has no effect on the film carriage since letter space clutch 37 remains de-energized during this period. Letter space solenoid plunger 35 is spring loaded so as to return to its starting position after solenoid 34 is de-energized. The return stroke of plunger 35 carries arm 33 out of engagement with the selected notch 31, thereby rotating the body and plate, 36 and 38, of the now energized letter space clutch 37 to move the film carriage a distance proportional to the width of the character previously exposed.

To measure the length of a line as it is composed, line length counting mechanism, indicated generally at 40, is tied to carriage drive shaft 39 through a rack 41 carried by the counting mechanism and engageable with a pinion 42 on drive shaft 39. For each measured rotation of shaft 39, caused by arm 33 moving out of a selected notch, the counting mechanism 40 is advanced a proportional amount, depending upon the width of the character associated with the notch in which arm 33 had previously been engaged.

Referring now to the justification mechanism, a word space counting mechanism, shown in the right hand portion of Figure 1 and indicated generally at 43, is provided. Each time the space bar 44 (Figure 8) is depressed in a parent machine, the counting mechanism moves one step upwardly as seen in Figure 1. Depressing bar 44 energizes the word space solenoid drive 45. Suitably attached to the word space solenoid plunger 46 is a second measuring probe 47, the movement of which measures word space lengths. Connected with probe 47, through arm 49 and pin 50, is a word space clutch 48 which controls the movement of the film carriage each time space bar 44 is depressed. A slot 51, provided in arm 49, permits relative radial movement between arm 49 and probe 47 (see Figure 3). Arm 49 is fixed to the word space clutch body 52 so that energization of the word space solenoid 45 rotates the word space clutch body 52, which, when energized, turns word space clutch plate 53 on shaft 39 to drive the film carriage. Rotation of shaft 39, through actuation of the word space solenoid 45, also moves the counting mechanism 40 through the aforementioned rack and pinion 41, 42.

During the first typing of a line before justification, each word space is a standard length determined by the travel of probe 47 to a standard space cam 54. After word space solenoid 45 is de-energized, plunger 46 is spring actuated to return probe 47 to normal or starting position. Clutch 48 is unidirectional so that the return movement by probe 47 has no effect on the counting mechanism 40 or the carriage drive mechanism A. A collar 55, provided adjacent the end of probe 47, is engageable with a fixed stop 56 to bring plunger 46 and probe 47 to rest.

As shown in Figures 1 and 3, a bellcrank 57, having a slotted arm 58 adapted to engage a pin 59 carried by probe 47, is rotatably mounted on a fixed pivot 60. The other arm 61 of bellcrank 57 carries a feed pawl 62 adapted to engage a word space counter bar 63 and in particular the teeth 64 thereon. Each time bellcrank 57 is rotated by the forward motion of rod 47, feed pawl 62 rides over teeth 64. Upon the return stroke of probe 47, caused by solenoid 45 becoming de-energized, however, a pawl spring 62a causes feed pawl 62 to engage a tooth to move the word space counter bar 63 to the left, as seen in Figure 1, thereby accurately recording the number of word spaces in the line. The plunger 46 of solenoid 45, being spring actuated for return movement, provides the compelling force to move word space counter bar 63 through bellcrank 57.

In order to return the word space counting mechanism 43 to its starting position after the second typing of a line, a spring 65 is provided on counter bar 63, being anchored thereon between a support 87 and a counter bar collar 66. Since spring 65 is put under compression as counter bar 63 moves to the left, it is necessary to provide a means for preventing counter bar 63 from moving back to its starting position as bellcrank 57 is rotated in a clockwise direction upon energization of word space solenoid 45. Therefore, a second locking pawl 67 is provided on mounting 68 to engage the teeth and thereby retain counter bar 63 in position.

A pin and guide bar structure, indicated generally at 69, is mounted upon word space counter bar 63. The pin and guide bar structure comprises a rod 70 which carries a pin 71 held between the side walls of a pin guide 72. Rod 70 is free to move axially through the end walls of pin guide 72 upon a T-bar 73 of counter mechanism 40 engaging pin 71. T-bar 73 is made sufficiently long so as to engage pin 71 anywhere along its transverse movement as the pin is carried by the word space counter bar 63.

To properly set the justification mechanism in order to justify a line upon a second typing of the line, a rotatable whisker or sensing lever 74 is provided, being pivoted about a fixed point 75 as it is engaged by pin 71. Rigidly fixed to whisker 74, and rotatable therewith, is a sector 76 which is engaged at its peripheral edge with the peripheral edge of another sector 77 mounted on a rotatable cam shaft 78, thereby providing an efficient friction drive having infinite degrees of advance for cam shaft 78 (see Figure 3). Fixed to cam shaft 78 and rotatable therewith are two cams. The first is the aforementioned circular standard word space cam 54 which is positioned to stop the travel of probe 47 during the first typing of a line. The second cam is a justifying cam 79 which has a peripherally graduated surface, some part of which is engageable by probe 47 upon the second typing of a line.

Referring to Figure 3, the cam shift mechanism comprises a square shaft 80 which is rotatably mounted in a thrust bearing 80a, and to which cam shaft 78 is non-rotatably and axially slidably mounted. During the first typing of a line, shaft 78 is connected to whisker 74 and sectors 76 and 77 through a coupling 81 and a shaft 79a, and standard cam stop 54 is positioned to stop the travel of probe 47. A bracket 82 is provided to support shafts 78 and 79a and the mechanism connected thereto. An arm 85 is provided to shift cams 54 and 79 alternatively into position where they may be engaged by probe 47. To move arm 85, and hence cams 54 and 79, a cam shift solenoid 83 is provided, having a plunger 84 to which arm 85 is fixed. During the first typing of a line, solenoid 83 is normally energized, thereby holding plunger 84 and arm 85 in an extended position wherein cam 54 is positioned in the line of travel of probe 47. During the second typing of a line, solenoid 83 is de-energized, thereby permitting its plunger 84 to be spring actuated to a position wherein cam 79 is positioned in the line of travel of probe 47.

Referring again to the line length counter mechanism 40, as the summation of word spaces and character spaces is measured, T-bar 73 is brought into engagement with pin 71 and thereafter pushes pin 71 between the walls of its guide structures 72. Although T-bar 73 is engaged with pin 71, transverse movement of the pin, caused by the word space counter bar 63 being moved to the left, has no effect on the counting mechanism. Continued advance of word space counter bar 63 and counting mechanism 40, however, brings them within a predetermined range of line justification wherein the apparatus is set to produce a justified and proportionally spaced line upon a second typing thereof. Thereafter, further continued movement of either the character counting mechanism alone or with the word space counter bar will cause whisker 74 to be turned about its fixed point 75 by pin 71. This in turn rotates sectors 76 and 77, thereby rotating shaft 78 during the first typing of a line. The rotation of shaft 78 has no effect on the length of travel of the probe 47 during this first typing of the line, the probe 47 being arrested in its movement by the circular standard word space cam 54. The shaft rotation does turn the justifying cam 79 as characters and word spacers continue to be selected for reproduction. At the end of the first typing, the standard space cam is shifted from its position where it is engageable with probe 47 and justifier cam 79 is moved into the line of travel of probe 47.

When the second typing of the same line is started, the travel by probe 47 is limited to that permitted by the justifier cam 79. The principle relied upon is that the justifying cam radius at each peripheral point is proportional to the tangent of the corresponding whisker angular displacement. Therefore, if the angular displacement of the whisker 74 is great with respect to the T-bar 73, this indicates that much space is left over at the end of the line and that, therefore, justifying cam 79 must permit the probe 47 to travel further in order to provide word spaces of greater than normal length. If the angular displacement of whisker 74 is small, there may even be a need of negative justification. That is, the standard word space will be decreased by some measure as indicated by the positions of lever 74 and the corresponding justifying cam 79.

Referring specifically to Figure 5, when the first typing of a line comes out equal to the length of the line desired, justifier cam 79 is so positioned as to provide a word spacing equal to the standard word spacing. Figure 5 clearly shows that the radius of the standard space cam 54 at the point where it is contacted by probe 47 is equal to the justifying cam radius at the point where it will be contacted by probe 47 and that probe 47 travel is $w$-units.

Figure 6 shows line length counter bar 73 X-units short of the margin or justified position. In this case the position of word space counter bar 63 indicates that the line just completed has 12 word spaces in it. Therefore justification of the line requires that each word space be increased by the fraction X over 12. To meet this required condition, rotation of whisker 74 has also rotated justifying cam 79 to give the required increased word spacing of $x$-units. T-bar 73 is also shown in a second position in Figure 6 in dotted lines as being Y units short of the margin required for justification. Justifier cam 79, however, will be in the same position. Therefore, each word space will be increased by the same fraction of X over 12 or in this case Y over 18, both of these fractions being equal to this tangent of the same angle of whisker 74. The new travel of probe 47 is shown as $x$-units.

Figure 7 shows a case where negative justification is required or where the word spacing is decreased in order to provide a justified line. The T-bar counter 73 is Z-units past the margin required to have a justified line. In this case 12 word spaces also have been counted. To justify the line each word space must be decreased by the fraction of Z over 12. Figure 7 shows that the justifier cam has been moved into such a position to reduce each word space to the required amount of $z$-units.

In Figures 5 to 7, the number of word spaces per line has been arbitrarily shown to be 12 spaces. However, the principle relied upon can be applied to any number of word spaces per line and is shown to be 12 for the purpose of illustration only.

Referring back to the character counting mechanism 40, a pair of support slides 86 and 87 are provided to permit T-bar 73 to slide forward each time a character or a word space is selected. Each slide has a slot 88 in which the ends of the cross bar 73 slide as the counting mechanism is moved. Posts 89 provide a main support for each cross slide support 87 and 88. To give greater rigidity to pin guide 72 and the entire word space counting mechanism, a second sliding bar 90, parallel with word space counter bar 63, is provided to support pin guide 72. Both bars 63 and 90 are conventionally supported by posts 91 having slots 92 for the bars to pass therethrough as they are pushed by the pawl mechanism.

A pawl release solenoid 93 is provided to release both feed pawl 62 and locking pawl 67 from engagement with bar 63 when the word space counting mechanism and the character counter are returned to their starting position. A cable 94 attaches each pawl to the pawl release solenoid plunger 95. As each pawl is pulled from engagement with the notches 64 on word space bar 63, spring 65 acts to return word space counter bar 63 and the mechanism attached thereto back to their original position.

The return of the character space counting mechanism 40 back to its original position, to be more fully described hereinafter, also permits pin 71 held in pin guide 72, to return to its original position. The pin is returned by means of a spring 96 which is attached to pin 71 and put under tension as the pin is pushed forward by the T-bar 73. As pin 71 moves from engagement with whisker 74, another spring 97a anchored to the sector 76 acts to return sector 76, whisker 74, and cam shaft 78 and the cams thereon, back to their starting position.

Referring to Figure 2, support legs 97, 98, 99 and 100 are provided at opposite ends of the carriage drive shaft 39. In addition, intermediate support legs 101 and 102 are provided adjacent the rack and pinion 41 and 42 respectively. A connecting brace 103 provides an additional support to rack 41 and its outer extremities, having a slot 104 therein for such purpose. Also, support legs 105 and 106 are provided adjacent the bevel gears 27 and 28. As seen in Figures 1 and 2, an electromagnetic carriage drive shaft brake 107 is provided on shaft 39 to accurately stop drive shaft 39, and hence the carriage movement, after actuation of either a character key or the word space bar. The brake body 108 is held fixed with respect to leg 106 by means of pins 109—109. De-energization of brake body 108 releases brake plate 110, permitting drive shaft 39 to rotate and move the carriage mechanism. After movement of the carriage mechanism, the brake again is energized, locking both drive shaft 39 and the carriage mechanism.

The bodies 36, 52, and 25 of the letter space clutch 37, the word space clutch 48, and the carriage drive clutch 24, respectively, are alike mounted on sleeves 111, as shown in Figure 1, permitting drive shafts 39 or 23 to rotate free of the clutch bodies. Similarly, the body 108 of the carriage drive shaft brake 107 is mounted on a sleeve 112 which permits shaft 39 to rotate relative to the brake body 107. The clutch plates 38, 53 and 26 of the respective clutches, and the brake plate 110 of the carriage drive brake 107, are all non-returnably mounted on their respective shafts 39 and 23. Energization of any of the clutch bodies, therefore, ties the clutch body to its respective plate and to the carriage drive shaft 39 or 23. Before drive shaft 39 is free to rotate, however, the carriage drive shaft brake must be de-energized by uncoupling the plate 110 from the brake body 108.

The sequence of operations, both for the character spacing and for word spacing, is controlled by a gang of cam operated contacts. A cam drive mechanism C is used which runs continuously, comprising control means for word spacing and separate control means for character spacing. A clutch system is provided which is capable of coupling either the word space control means or the character space control means to the particular cam by controls and to the motor drive for exactly one revolution.

Referring in particular to Figure 8, the sequence of operation is as follows: After the character bearing exposure segment 29 is positioned at exposure area 32 for the photographic exposure of a selected character, the normal print cycle control, as disclosed in our aforementioned pending patent application, energizes the letter space solenoid 34 through line 132. The depth of travel of the solenoid actuated arm 33 into the notch 31 related to the character selected for exposure determines the width of the character and the amount of carriage feed necessary for the character printed. With the completion of the stroke of letter space solenoid plunger 35, contact $l'$ is closed to complete an electrical circuit to a shutter solenoid 133 and operate the shutter mechanism (also shown in our aforementioned pending application). As the shutter solenoid 133 completes its stroke, it closes contact $l$, thereby completing the circuit to the letter space cam drive clutch 113 and locking in the letter space cam drive clutch system for exactly one revolution through clutch body 114 and clutch plate 115. The cam system first closes a contact $h$ by means of a letter space clutch cam 117, thereby energizing letter space clutch 37. Secondly, the cam system releases the carriage brake 107 so that drive shaft 39 may be permitted to turn. The carriage brake is released by a cam 116 opening a contact $i$. In the meantime, a letter space solenoid cam 118 maintains a contact $g$ closed a sufficient time, completing a holding circuit for letter space solenoid 34 until clutch 37 is energized to assure that return movement of plunger 35 will be transmitted to the carriage. Also, letter space drive clutch cam 119 closes contact $f$, which is in parallel across contact $l$, to complete a holding circuit for the letter space cam drive clutch 113, even though contact $l$ is permitted to open by shutter solenoid 133. A fifth auxiliary cam 120, which forms no part of the carriage advancement controls, is provided to cooperate with a contact $k$ which is parallel to the resetting prevention circuit, shown in the aforementioned pending patent application. Thirdly, the cam system releases the letter space solenoid 34, which, being spring actuated for return movement, moves arm 33 from the notch 31 associated with the character which has just been exposed. The backward motion of arm 33 is transmitted through the letter space clutch 37, which has been energized, thereby rotating shaft 39 and driving the film carriage mechanism through shafts 39 and 23, carriage drive clutch 24 (when energized), and bevel gears 27 and 28. The distance moved by the film carriage mechanism is proportional to the depth of the slot in the disc 30. The letter space cycle is completed by cam 116 closing switch $i$ and electrically resetting the carriage brake 107, by cam 117 opening contact $h$ and releasing the letter space clutch 37, and by cam 120 resetting the print cycle by closing contact $k$.

For word spacing, the word space cam drive clutch system also is controlled by a one revolution clutch 121. Closing a keyboard contact $m$ by depressing space bar 44 energizes an electromagnetic clutch body 121a to attract a clutch plate 121b, thereby tying the gang of cams 122–126 to drive mechanism C for one revolution. Rotation of the gang of cams causes cam 126 to close a contact $e$, sealing the word space cam drive clutch system for one revolution. Contact $a$ is next closed by an auxiliary print cycle control cut out cam 122, which forms no part of the carriage advancement control mechanism, thereby preventing operation of the print cycle during a word space cycle. Secondly, cam 123 closes a contact $c$ thereby energizing the word space clutch 48. Third, cam 124 opens a contact $b$ to release carriage brake 107 in order to permit drive shaft 39 to rotate. Fourth, cam 125 closes a contact $d$ to energize the word space solenoid drive 45. Actuation of the word space solenoid 45 thus moves the carriage the measured word space distance through energized word space clutch 48, de-energized brake 107 and shafts 39, 23. The word space cycle is continued by setting the carriage brake 107, achieved by cam 124 permitting contact $b$ to close, de-energizing the word space clutch 48 by opening contact $c$ and de-energizing word space solenoid drive 45 by opening contact $d$. Word space solenoid 45, once de-energized, is reset by spring action. The cycle is completed as the word space cams complete their 360° turn and reestablish the print cycle by cam 122 allowing contact $a$ to close.

In Figure 8 a graphical representation of the cam operated contacts also is shown, there being one line opposite each cam and the contact operated thereby. For each revolution of a cam, the solid line represents that part of the revolution wherein the respective contact is effectively closed by the cam. Thus, it can be seen that contacts $e$ and $f$ are retained effectively closed during the major part of a revolution in order to afford holding circuits for their respective clutches 121 and 113, depending upon whether a word space or a character space is needed. Similarly, the effective operating time for each probe actuator 34 and 45, the brake 107, and for each clutch 24, 37 and 48 can readily be seen.

The justification scheme requires a first and second typing. At the beginning of the first typing, the operator presses a first typing button 127, opening a contact $n$ to the photoprinter exposure lamp while closing a contact $o$ to energize cam shaft solenoid 83 and maintain the standard space cam 54 in a position where it can be contacted by probe 47. At the same time, by depressing the first typing button 127, a contact $p$ is opened, thereby de-energizing carriage drive clutch 24 and permitting the carriage mechanism to remain in a starting position while no photoprinting is taking place.

Upon the completion of the printing of the first line, the operator pushes the second typing button 128 causing contact $o$ to open and de-energizing solenoid 83. Solenoid plunger 84, being spring actuated, returns to a normal position pulling the justifying cam 79 into a position where it may be engaged by probe 47 in order to achieve measured word spaces in a justified line. Depressing button 128 also closes contact $n$ to energize the photocomposing exposure lamp while contact $p$ is closed to energize the carriage drive clutch 24 so that the carriage can now be moved as the second typing reproduces a justified photo-composed line. After the completion of the second typing of the justified line, the mechanism may be reset to permit a first typing of the next line.

Reset of the apparatus is achieved by operation of a reset bar 129, which when depressed energizes the necessary circuitry to return the apparatus to initial position. A return drive motor 130 is coupled to shaft 23 through a clutch 135 to return the carriage advancement mechanism after the completion of a justified reproduction of a line. To de-energize motor 130, a normally closed contact 131 is provided, being cooperable with a conventionally placed arm on the carriage to open as the carriage reaches its starting position.

By depressing bar 129, a contact $q$ is closed and, being in the same circuit with contact $p$, energizes carriage drive clutch 24. Contact $r$ also is closed, thereby energizing carriage return motor 130, which when energized drives the carriage mechanism through a gear box 134 back to its starting position. Return drive clutch 135 couples motor 130 to shaft 23 and the carriage during only that period when motor 130 is energized, thus permitting the carriage advance mechanism to operate free of any additional load at all other times. Contact $s$, which also is closed by depressing button 129, energizes pawl release solenoid 93, thereby pulling both feed pawl 62 and locking pawl 68 from engagement with the notches 64 on word space bar 63. Springs 65 and 96 thus are permitted to return word space bar 63, sectors 76 and 77, and cam shaft 78 to their respective starting positions. As motor 130 drives the rack 21 and pinion 22 to return the carriage mechanism to its starting position, it also moves rack 41 through pinion 42, returning the line length counting mechanism 40 to its starting position. This in turn permits pin 71 to be pulled back by spring 96. As the carriage mechanism is returned by motor 130 to its starting position, the conventionally placed carriage arm opens contact 131, thereby de-energizing carriage return motor 130. Contact 131 is restored to its closed position as the carriage is moved for reproduction of the next justified line.

The carriage drive shaft brake 107 must also be de-energized during the period when motor 130 is returning the carriage mechanism to its starting position, since driving motion must also be imparted to the character counter mechanism 40. Therefore, a normally closed contact $t$ is opened as reset bar 129 is depressed, thereby de-energizing the carriage drive shaft brake 107. When bar 129 is released and returns upwardly to its normal position, contact $t$ is again closed and the carriage brake mechanism is set for its normal use.

Once the control and the carriage mechanisms are returned to their normal position, the photoprinter is ready for the first typing of the next line, at the completion of which the next line is then reproduced in justified form. The procedure of first typing of a line, second typing of the line, and resetting, is continued until the full text is reproduced.

The use of reset bar 129 also readily permits corrections to be made before a line is reproduced in final or justified form. If, after the first typing of a line, the operator notices any mistakes in the line, he merely need depress bar 129 to return the justification mechanism to its starting position, retype the first copy of the line in correct form, and then reproduce the line in its justified form.

The aforedescribed apparatus is readily adjustable to permit the reproduction of justified lines of varied lengths. Referring to Figure 1, it is apparent that travel by the carriage is always reflected by proportional travel of T-bar 73 in the line length counting mechanism 40, and in turn also is reflected by rotation of the standard and justifying cams 54, 79, respectively, once the range of justification is reached. This is true since the carriage and line length counting mechanism 40 are integrally tied together during the second typing of a line in justified form. Therefore, no matter where the carriage is first positioned for defining the left-hand margin of the text to be reproduced, T-bar 73 is relatedly positioned for defining the starting position of line length counting mechanism 40.

When it is desired to reproduce short justified lines, say only two inches in length, a conventional carriage left hand margin tab is set so that carriage travel commences at a point such that T-bar 73 also is allowed to start its movement very close to the range of line justification. In other words, T-bar 73 moves only a short distance before it engages pin 71. On the other hand, when it is desired to reproduce justified lines of considerable length, the carriage left-hand margin tab is set to allow the carriage to assume a starting position to the right of the starting position for shorter lines. This, in turn, also sets T-bar 73 at a starting point which is farther away from the range of line justification, necessitating a longer T-bar travel before it engages pin 71. Whether the text is to comprise long or short lines, however, the right-hand margin evidencing justification is always defined as that carriage position which is in agreement with the T-bar setting shown in Figure 5. The right-hand margin thus remains fixed, while the left-hand margin is adjustably set by conventional margin tabs in accordance with the line length requirements of the text.

In order to permit initial manual positioning of the carriage and T-bar 73 for setting the marginal tabs, brake 107 first must be de-energized. Therefore, a brake release button 136 is placed adjacent rack 41, and when it is depressed, a normally closed contact 137 is opened, thereby de-energizing brake 107 to permit setting the carriage and T-bar in their respective starting positions.

When a line is short, such as may occur at the end of a paragraph, the justification mechanism will not excessively spread out the line, since no setting of justifying cam 79 occurs until the range of justification is reached. The setting of cam 79 is done completely automatically, requiring neither reading of dials nor computation by the operator. A second typing of a short line reproduces the line in non-expanded form.

The invention also is adaptable to instances where a definite character unit width system is followed. In such a case, a definite unit width is assigned to each character, with the notch 31 corresponding thereto having a definite unit depth.

Various other modifications within the spirit of the invention may occur to those skilled in the art. Therefore, it is intended that no limitations be placed on the invention except as defined by the scope of the appended claims.

We claim:

1. Carriage advancement apparatus comprising, in combination, a carriage, means responsive to character selection for imparting character spacing movement to the carriage, a driving element responsive to word spacer bar operation for imparting word spacing movement to said carriage, mechanism connecting said character selection responsive means and said driving element to said carriage, means movable in a first direction upon operation of said driving element, means connected with said mechanism and movable in a direction transverse to said first direction in accordance with line length requirements, sensing means responsive to the movement of either movable means, and an adjustable stop positionable by said sensing means to limit the effective travel of said driving element in accordance with the word spacing required to justify said line without affecting character spacing as said line is reproduced in justified form.

2. The combination as set forth in claim 1, wherein said character selection responsive means drives said carriage in variable steps according to the width of the characters selected for reproduction and comprises a second driving element, means for driving said second driving element in response to character selection, a positionable member having a set of variable depth peripheral notches thereon corresponding to the characters capable of being selected for reproduction, each of said notches further being engageable by said second driving element for determining the width requirements of characters corresponding thereto, linkage connecting said second driving element with said mechanism, and means positioning said positionable member in response to character selection so that the notch corresponding to a selected character is positioned before said second driving element.

3. The combination as set forth in claim 2 wherein said positionable member is rotatably mounted and juxtaposed to said carriage, and additionally including an exposure shuttle mounted on said positionable member and having a set of characters thereon for selective display to film in said carriage, whereby selection of a character positions said positionable member so that the exposure character corresponding thereto is positioned at an exposure area for photographic display to said film while the notch corresponding thereto is positioned before said second driving element for determining the width requirement of said character.

4. Automatic carriage advancement mechanism comprising a character width measuring probe; a word space measuring probe; a motor to drive said character width measuring probe; a motor to drive said word space measuring probe; a positionable stop member having variable depth notches thereon corresponding to the width requirements of characters selected for reproduction; a rotatable cam shaft; a circular stop cam on said shaft; a second stop cam on said shaft having a peripherally graduated surface; means to bodily shift and to alternatively position said cams to intercept the travel of said word space probe; a common drive shaft driven by either of said measuring probes to cause carriage movement according to either character space requirements or word space requirements; means controlling drive shaft operations according to which probe is actuated; a word space counter bar; a series of teeth on said word space counter bar; linkage including a member for contacting the teeth on said word space counter bar, said linkage being connected to said word space probe for advancing said word space counter bar in a step by step manner as word spaces are required; a rigid part connected with said word space counter bar and adapted to move therewith in a first direction in response to word space requirements; a line length counter connected with said drive shaft for movement in response both to character space and word space requirements, said line length counter being adapted to move said rigid part in a direction transverse to said first direction; a pivotal arm to sense the position of said rigid part while a portion of an unjustified line is being produced; means for positioning said positionable stop member; and means connecting said pivotal arm with said cam shaft for measured rotation thereof, whereby, upon a second typing of said line, that portion on the peripherally graduated surface on said second cam positioned to intercept travel by said word space probe, permits only that word space probe travel which is necessary to effect justification of said line.

5. The apparatus of claim 4 and additionally including an exposure shuttle mounted on said positionable member and having a set of characters thereon for selective display to film in the carriage controlled by said advancement mechanism.

6. The apparatus of claim 4 and additionally including the feature that the radius of each peripheral point on said second cam is related to a corresponding position assumed by said pivotal arm within the range of line justification, whereby the radius at the peripheral point positioned to be engaged by said word space probe is proportional to the tangent of the angle with reference to a standard position assumed by said pivotal arm.

7. Automatic carriage advancement mechanism capable of producing proportionally spaced and justified text material on a first and second typing principle, comprising a character width measuring means; a word space measuring means; a positionable member having a set of abutments thereon adapted to be positioned before and engaged by said character width measuring means, each of said abutments being related to a character available for reproduction and when positioned before said character width measuring means having a distance from the starting point thereof proportional to the width of the related character; means for selectively positioning said member; a standard stop, engageable with said word space measuring means during the first typing of a line; a second stop, engageable with said word space measuring means during the second typing of a line, and having a peripherally graduated surface; means for shifting and alternatively positioning said standard stop and said second stop; a drive shaft driven by either of said measuring means to cause movement of a carriage according to either character space requirements or word space requirements; means controlling drive shaft operation according to which measuring means is actuated; a word space counter connected with said word space measuring means for advancement as word spaces are required; a line length counter connected with said drive shaft for advancement proportional to word and character space requirements; a rigid arm, positionable by said word space counter in a first direction, and positionable by said line length counter in a direction transverse to said first direction; adjusting means controlled by said arm while a portion of an unjustified line is being reproduced; and adjustable means connected with said adjusting means for positioning the portion on the peripherally graduated surface on said second stop required to be engaged by said word space measuring means in order to limit travel thereof and effect line justification without affecting character spacing upon a second typing of said line.

8. The apparatus of claim 7 wherein said word space counter, said rigid arm, and said adjusting means are each spring biased for return movement to a respective starting position, and wherein said line length counter retains said rigid arm and said adjusting means from returning to their respective starting position; and additionally including return drive means connected with said drive shaft, means restraining said word space counter from returning to its starting position, and means for releasing said word space counter restraining means, whereby actuation of said releasing means and said return drive means returns the carriage advancement mechanism to initial position.

9. Apparatus described in claim 7 wherein the peripherally graduated surface comprises a first portion converging towards the center of said second stop, said first portion when positioned before said word space measuring means permitting greater than standard travel thereby during the second typing of a line; and a portion diverging from the center of said second stop, said second portion when positioned before said word space measuring means permitting less than standard travel thereby during the second typing of a line, the junction of said converging and diverging portions when positioned before word space measuring probe permitting standard travel thereby during the second typing of a line.

10. Automatic carriage advancement mechanism comprising in combination: a carriage; a rack on said carriage; a pinion engageable with said rack; a drive shaft; first driving means connected with said shaft and actuable after character selection; second driving means connected with said shaft and actuable upon word space selection; a first stop; a shuttle carried by said stop and having a set of characters thereon for light exposure to film in said carriage; a series of peripheral notches along the peripheral edge of said first stop, each of said notches having a depth proportional to the width of a corresponding exposure character, said notches and said corresponding exposure characters being in such order that positioning of a character for exposure further positions the notch corresponding thereto before said first driving means to limit the operation thereof; means for positioning said first stop; a second stop limiting operation of said second driving means during the printing of an unjustified line; a word space counter bar having a set of teeth thereon; linkage connected with said second driving means and engageable with said teeth for advancing said word space counter bar in a first direction; a line length counter bar connected with said shaft for movement in a direction perpendicular to said first direction; a slotted guide carried by said word space counter bar for movement in said first direction, the slot in said guide extending parallel to said perpendicular direction; a rigid arm slidably held within said guide for movement therewith in said first direction and movement therein in said perpendicular direction; a rod on said line length counter bar, extending parallel to said first direction, of such length as to engage said rigid arm anywhere along its first direction travel, and adapted to move said rigid arm within said guide in said perpendicular direction; a rotatable lever engageable by said rigid arm while a portion of an unjustified line is being printed; a cam shaft; means connecting said cam shaft with said lever; a third stop on said cam shaft, said third stop having a peripherally graduated surface for limiting operation of said second driving means during the printing of a justified line, that portion of the peripherally graduated surface positioned to limit second driving means operation being such as to allow only that second driving means operation necessary to effect justification of a line without affecting character spacing upon a second printing of a line; and means to alternatively position said third stop.

11. A line justifying control comprising the combination with a machine for producing printed text and having a work holder and a measuring probe connected with said work holder for controlling movement thereof between words; of means movable in a first direction in response to the operation of a word spacer bar, means connected with said work holder and movable in a direction transverse to said first direction in accordance with line length requirements, adjusting means controlled by either movable means while an unjustified line is being reproduced, and a cam positionable by said adjusting means, said cam having a peripherally graduated surface which is selectively positioned within the range of line justification during the reproduction of said unjustified line, said peripherally graduated surface being so positioned at the end of said unjustified line as to present upon a second reproduction of said line that surface portion capable of limiting travel by said measuring probe to that necessary in order to produce said line in justified form.

12. Justification mechanism for adjustably regulating carriage movement whereby the spacing between words of a line is uniformly varied to produce justified text material, comprising in combination: a carriage, a driving element responsive to operation of a word spacer bar for imparting word spacing movement to said carriage, means connecting said driving element with said carriage, means connected with said driving element and movable in a first direction in accordance with word space requirements, means connected with said carriage and movable in a direction transverse to said first direction in accordance with line length requirements, settable means responsive to the movement of either movable means, adjusting means controlled by said settable means within the range of line justification while a portion of an unjustified line is being reproduced, and adjustable means positionable by said adjusting means to vary the effective movement of said driving element in accordance with the word spacing required to justify said line as said line is reproduced in justified form.

13. The justifying mechanism of claim 12 wherein the means connecting said driving element with said carriage comprises a shaft, a unidirectional clutch mounted on said shaft, an arm connecting said driving element with said clutch for measured shaft rotation, said arm being rigidly mounted to said clutch at one end and having a slot at its other end wherein a driving element mounted pin is held, a pinion controlled by rotation of said shaft, and a rack mounted on said carriage and engageable with said pinion to effect carriage movement for spacing between words.

14. Line justifying mechanism comprising a driving probe responsive to operation of a word spacer bar, a shaft driven by said probe and adapted to impart movement to a member for spacing between words of a line; a word space counter connected with said driving probe and movable in a first direction in accordance with word space requirements; a line length counter adapted to be connected to said member and movable in a direction transverse to said first direction in accordance with line length requirements; a slotted guide connected with said word space counter bar for movement in said first direction, the slot therein extending parallel to said transverse direction; a rigid arm mounted on said guide for movement with said word space counter bar in said first direction; a bar connected with said line length counter, extending parallel to said first direction, and of such length as to engage said arm anywhere along its first direction travel, said parallel extending bar being adapted to move said arm in said slot in said transverse direction; a rotatably mounted lever engageable by said arm while a portion of an unjustified line is being typed; a cam shaft; means connecting said lever with said cam shaft for measured rotation thereof; a cam on said shaft having a peripherally graduated surface engageable by said driving probe during the justified typing of said line, that portion of said peripherally graduated surface engageable by said driving probe being such as to allow that probe travel necessary to effect word spaces of sufficient length to justfy said line upon a second typing thereof, and means to bodily shift and position said cam to intercept the travel of said driving probe during the justified typing of a line and to alternatively position said cam out of the line of driving probe travel during the typing of an unjustified line.

15. The invention as described in claim 14 wherein said line length counter has an independent return drive means, and wherein said rigid arm, said lever and said word space counter bar are each separately spring biased for return movement to a respective starting position and additionally including a latch restraining said word space counter bar from returning to its starting position, and means for releasing said latch, whereby actuation of said return drive means moves said line length counter back to a starting position, releasing said rigid arm and said lever for return movement, and actuation of said latch release means allows the word space counter bar to return to its starting position.

16. The invention as recited in claim 14 and additionally including a stop limiting driving probe travel during the typing of an unjustified line to that travel necessary to effect a standard spacing between words.

17. In combination, a carriage and automatic carriage advancement mechanism of the type wherein carriage travel for character spacing is in accordance with the width of each character printed thereon, and carriage travel for word spacing is in accordance with that spacing between words of a line necessary to justify said line, said mechanism including a first and a second driving probe, motor means responsive to word spacer bar operation for actuating said first driving probe and imparting measured word spacing movement to said carriage, second motor means responsive to character selection for actuating said second driving probe and imparting measured character spacing movement to said carriage, and electrical means controlling carriage advance according to which said motor means is actuated.

18. A combination according to claim 17, wherein the electrical means controlling carriage advance comprises a first gang of cam operated contacts actuable by word spacer bar operation, an electrical clutch controlled by closing of a first contact in said first gang of contacts for operatively linking said first driving probe with said carriage, electrical interlock means controlled by said first gang of contacts insuring that an initiated carriage word spacing movement is completed irrespective of the release of said word spacer bar, a second gang of cam operated contacts actuable after any character key operation, a second electrical clutch controlled by closing of a first contact in said second gang of contacts for operatively linking said second driving probe with said carriage, second electrical interlock means controlled by said second gang of contacts insuring that an initiated carriage character spacing movement is completed irrespective of subsequent character key operation, and means for driving the cams operating said contacts.

19. A combination according to claim 18, and additionally including an electrical brake for assuring precise carriage movement, and a pair of contacts, one in each gang of cam operated contacts, operable to open and release said brake to allow carriage movement, and closeable to energize said brake and limit carriage travel at the end of the required movement thereof.

20. A justification apparatus for a justifying typewriter, photocomposer, or like machine of the kind in which a line is first reproduced using word spacing increments of given of given length and is subsequently reproduced a second time with different word spacing increments to afford a justified line, said apparatus comprising: a variable diameter stop, for determining the length of word spacing increments within a predetermined range including said given length in reproduction of a justified line; means for rotating said stop, during reproduction of an unjustified line, through an arc determined by the total length of said line and by the number of word spaces in said line; and word spacing means, including a probe engageable with said stop during reproduction of a justified line, for varying the length of word spacing increments in said justified line in accordance with the angular orientation of said stop.

21. A justification apparatus for a justifying typewriter, photocomposer, or like machine of the kind in which a line is first reproduced using word spacing increments of given length and is subsequently reproduced a second time with different word spacing increments to afford a justified line, said apparatus comprising: a variable diameter stop, for determining the length of word spacing increments in reproduction of justified line, movable between an inactive and an active position; means for rotating said stop, during reproduction of an unjustified line with said stop in said inactive position, through an arc determined by the total length of said line and by the number of word spaces in said line; means, including a probe engageable with said stop when said stop is in said active position, for varying the length of word spacing increments in a justified line in accordance with the angular orientation of said stop; and means for moving said stop between said inactive and active positions for the reproduction of unjustified and justified lines, respectively.

22. A justification apparatus for controlling movements of a carriage, said apparatus comprising: character spacing drive means, responsive to character selection, for imparting character spacing movement to a carriage; word spacing drive means for imparting word spacing movement, in increments of given length, to said carriage; a first counter member, movable in a given direction in response to operation of said word spacing drive means; a second counter member, movable in a second direction in response to operation of both said character spacing drive means and said word spacing drive means; sensing means responsive to movement of both of said counter members; and an adjustable stop, positionable by said sensing means, for changing the length of incremental movement of said word spacing drive means in accordance with the word spacing required to justify a line.

References Cited in the file of this patent

UNITED STATES PATENTS

| | | |
|---|---|---|
| 2,322,222 | Colton | June 22, 1943 |
| 2,328,097 | Reid | Aug. 31, 1943 |
| 2,390,413 | Ayres | Dec. 4, 1945 |
| 2,465,657 | Norton | Mar. 29, 1949 |
| 2,506,702 | Chisholm | May 9, 1950 |
| 2,725,803 | Tansel | Dec. 6, 1955 |